(12) United States Patent
Zhang et al.

(10) Patent No.: US 8,177,504 B2
(45) Date of Patent: May 15, 2012

(54) FAN MODULE

(75) Inventors: Gui-jiao Zhang, Shanghai (CN); Shou-Jen Yang, Taipei (TW)

(73) Assignee: Inventec Corporation, Taipei (TW)

( * ) Notice: Subject to any disclaimer, the term of this patent is extended or adjusted under 35 U.S.C. 154(b) by 769 days.

(21) Appl. No.: 12/273,275

(22) Filed: Nov. 18, 2008

(65) Prior Publication Data

US 2010/0025017 A1    Feb. 4, 2010

(30) Foreign Application Priority Data

Jul. 31, 2008    (CN) .......................... 2008 1 0129608

(51) Int. Cl.
*F01D 25/26* (2006.01)
*F01D 25/28* (2006.01)
*F03B 11/00* (2006.01)
*F03D 11/04* (2006.01)
*F04D 29/60* (2006.01)

(52) U.S. Cl. .................................. 415/213.1; 415/214.1

(58) Field of Classification Search ............... 415/213.1, 415/214.1, 220

See application file for complete search history.

(56) References Cited

U.S. PATENT DOCUMENTS

| 6,186,524 | B1 * | 2/2001 | McQueeny et al. ...... 280/87.021 |
| 6,236,564 | B1 * | 5/2001 | Fan ................................ 361/695 |
| 2007/0003413 | A1 * | 1/2007 | Hsu et al. .................... 415/199.5 |

* cited by examiner

*Primary Examiner* — Chuong A Luu
*Assistant Examiner* — Nga Doan
(74) *Attorney, Agent, or Firm* — J.C. Patents

(57) ABSTRACT

A fan module including a fan frame, at least one fan unit, and a plurality of resilient pins is provided. The fan frame is provided with an accommodation space therein and is disposed with a plurality of mounting slots thereon. The fan unit is disposed in the accommodation space and has a base, in which the base has a plurality of mounting holes corresponding to the mounting slots. Each resilient pin has an insert end and a catch end. The insert end is penetrated through the corresponding mounting hole and the catch end is caught in the corresponding mounting slot, such that the fan unit is mounted to the fan frame by the resilient pins. Since the resilient pins are used to replace conventional screws in the present invention, the fan module is enabled to have a better damping effect, thereby meeting requirements for low-noise operation.

5 Claims, 4 Drawing Sheets

FAN MODULE

CROSS-REFERENCE TO RELATED APPLICATION

This application claims the priority benefit of China application serial no. 200810129608.9, filed on Jul. 31, 2008. The entirety of the above-mentioned patent application is hereby incorporated by reference herein and made a part of specification.

BACKGROUND OF THE INVENTION

1. Field of the Invention

The present invention generally relates to a fan module, in particular, to a fan module with a fan unit fixed within a fan frame.

2. Description of Related Art

Heat dissipation in electronic products such as servers is mostly achieved depending upon the operation of a plurality of fan units. The fan units are disposed in a fan frame, so as to constitute a fan module for providing strong cooling air flows. In most cases, the fan frame for supporting the fan module is secured to a bottom plate or a side plate of a chassis via screws, and the fan units are also secured to the fan frame via screws. When each of the fan units operates, the above portions connected by connecting pieces such as screws may vibrate and produce noises.

In order to overcome the noise problem, the damping effect of the assembled fan structure is the key point in the design stage. As for the fan damping design in the prior art, in order to improve the buffering effect of connecting portions between the fan units and the fan frame, elastic washers are disposed on the screws, so as to prevent the fan units from vibrating and generating noises due to being fixed via screws. However, since there are too many parts and the conventional securing manner is inconvenient for assembly and disassembly, the fan units cannot be easily assembled and disassembled, which affects the product production and maintenance efficiency. Moreover, since the elastic washers are directly contacted with the screws, they are easily abraded due to frequent assembly and disassembly of the screws.

SUMMARY OF THE INVENTION

Accordingly, the present invention is directed to a fan module, which is suitable for being mounted in a chassis for heat dissipation and has properties of a low noise and being convenient in assembling and disassembling processes.

In order to specifically describe the present invention, a fan module is provided, which mainly includes a fan frame, at least one fan unit, and a plurality of resilient pins. The fan frame is provided with an accommodation space therein and is disposed with a plurality of mounting slots thereon. The fan unit is disposed in the accommodation space and has a base, in which the base has a plurality of mounting holes corresponding to the mounting slots. Each of the resilient pins has an insert end and a catch end. The insert end is penetrated through the corresponding mounting hole and the catch end is caught in the corresponding mounting slot, such that the fan unit is mounted to the fan frame by the resilient pins.

In an embodiment of the present invention, each of the resilient pins has an insert end and a tail end. Between the insert end and the tail end, each of the resilient pin is further provided with a first stopper portion, a second stopper portion, a third stopper portion, a first necked-down portion located between the first stopper portion and the second stopper portion, and a second necked-down portion located between the second stopper portion and the third stopper portion. The first necked-down portion is located within the corresponding mounting hole, and the first stopper portion and the second stopper portion are respectively pressed against surfaces of the base around the mounting hole. Moreover, the second necked-down portion is located within the corresponding mounting slot, and the second stopper portion and the third stopper portion are respectively pressed against surfaces of the fan frame around the mounting slot.

In an embodiment of the present invention, the fan frame includes a first frame unit and a second frame unit that are parallel with each other. The accommodation space is located between the first frame unit and the second frame unit, and the mounting slots are respectively located at upper edges of the first frame unit and the second frame unit. Moreover, the fan frame may further include a plurality of partitions disposed between the first frame unit and the second frame unit, so as to divide the accommodation space into a plurality of sub-accommodation spaces for accommodating the fan units respectively.

In an embodiment of the present invention, the base of the fan unit respectively has an extension portion at a position corresponding to each mounting slot, and the mounting holes are respectively located on the extension portions and penetrate through the extension portions.

In an embodiment of the present invention, a side edge of the insert end of each of the resilient pins has at least one buffer slot for providing an allowance sufficient for the insert end to enter or leave the mounting hole after elastic deformation. In other words, when the insert end of the resilient pin passes through the mounting hole, the space of the buffer slot enables the insert end to generate a larger deformation upon being extruded, such that the deformed insert end is successfully inserted into the mounting hole.

In view of the above, since the resilient pins are used to replace conventional screws in the present invention, the fan module has a better damping effect and meets requirements for low-noise operations. Moreover, the present invention simplifies the assembling manner of the fan module through structural designs. When assembling the fan module, an operator can mount the fan units to the fan frame simply by inserting the insert ends of the resilient pins into the mounting holes of the fan units first, and then disposing the fan units into the accommodation space of the fan frame, such that the catch ends of the resilient pins enter and are caught in the mounting slots on the fan frame. Therefore, the fan module of the present invention is convenient for assembly and disassembly, thereby improving the product production and maintenance efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
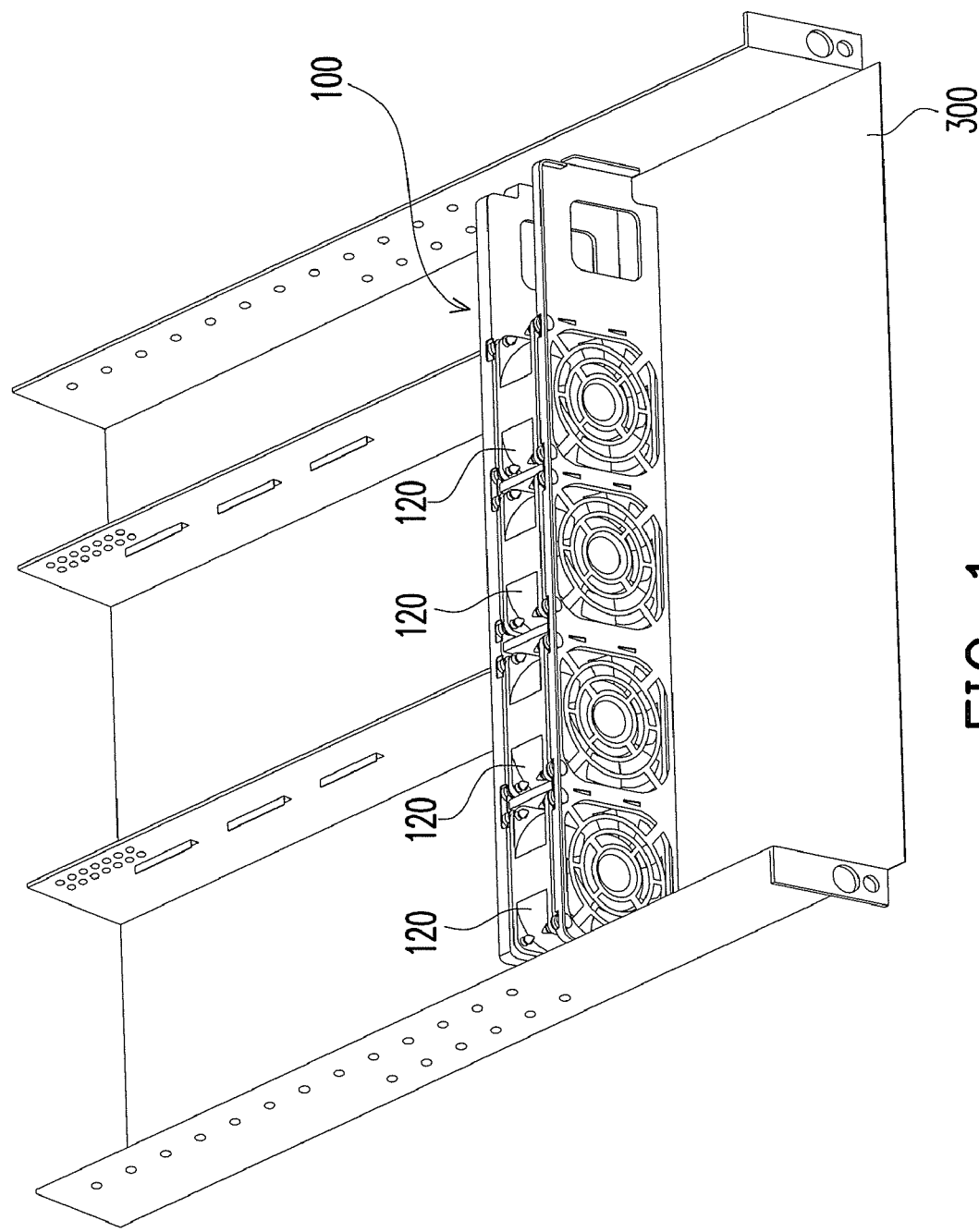
FIG. 1 is a schematic view of a fan module disposed on a bottom plate of a chassis of a server according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The fan module of the present invention is applicable to electronic products such as servers, computers, business machines, household appliance products, and communication equipments, but the application field thereof is not limited herein. Moreover, depending upon the requirements of practical applications or designs, those skilled in the art can adjust or modify the actual structure of the fan module with reference to the content of this specification without departing from the sprits and scope of the present invention. However, specific illustrations are given below by, for example, applying the fan module of the present invention to a server.

FIG. 1 is a schematic view of a fan module disposed on a bottom plate of a chassis of a server according to an embodiment of the present invention. Referring to FIG. 1, a fan module 100, suitable for being mounted to a bottom plate 300 of a chassis, includes at least one fan unit 120 therein (there is a plurality of fan units 120 in this embodiment), so as to generate cooling air flows in the chassis of a server for heat dissipation. Each fan unit 120 is, for example, connected to an external control circuit and a power supply via cables, so that the operations of the fan unit 120 are controlled and the fan unit 120 is supplied with a power.

Figure 2:
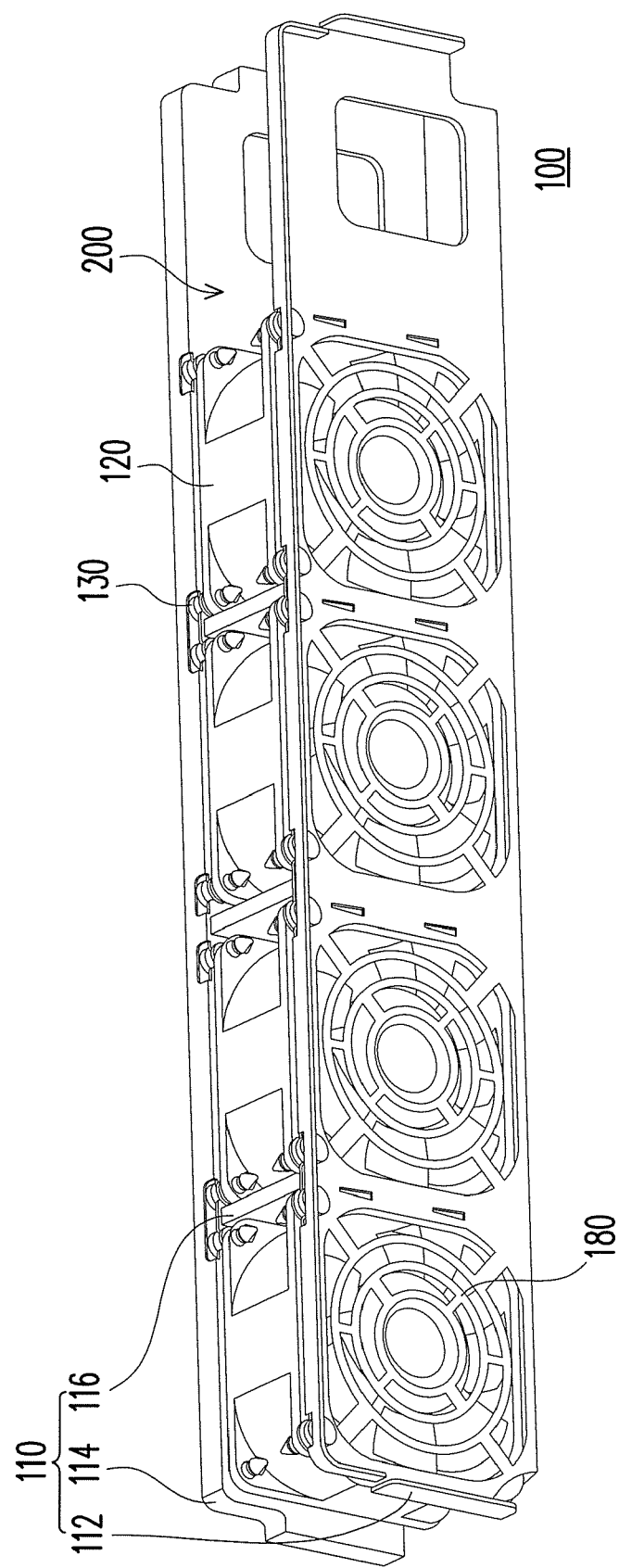
FIG. 2 shows a detailed structure of the fan module of FIG. 1.
Figure 3:
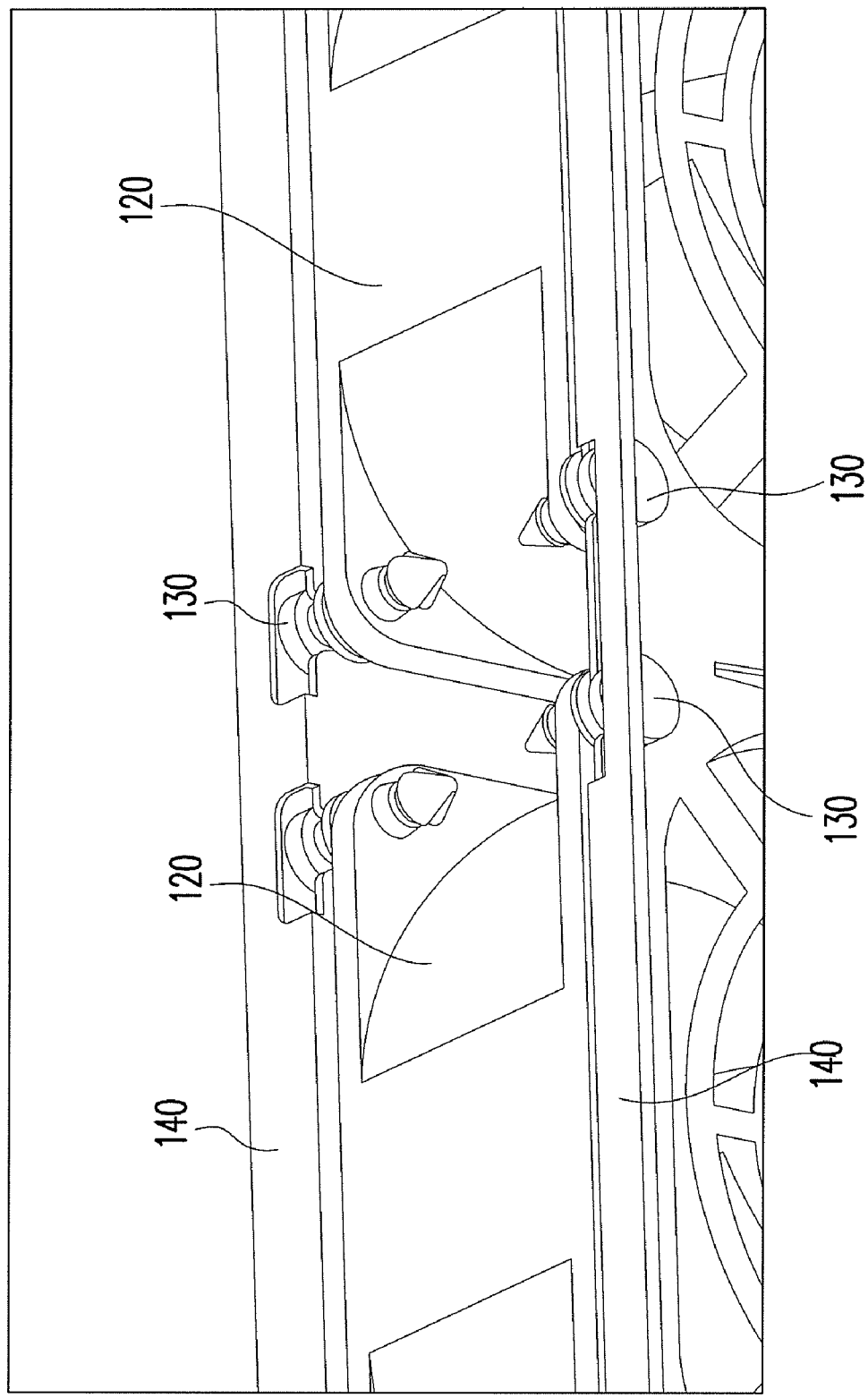
FIG. 3 is a partial enlarged view of the fan module of FIG. 2.
Figure 4:
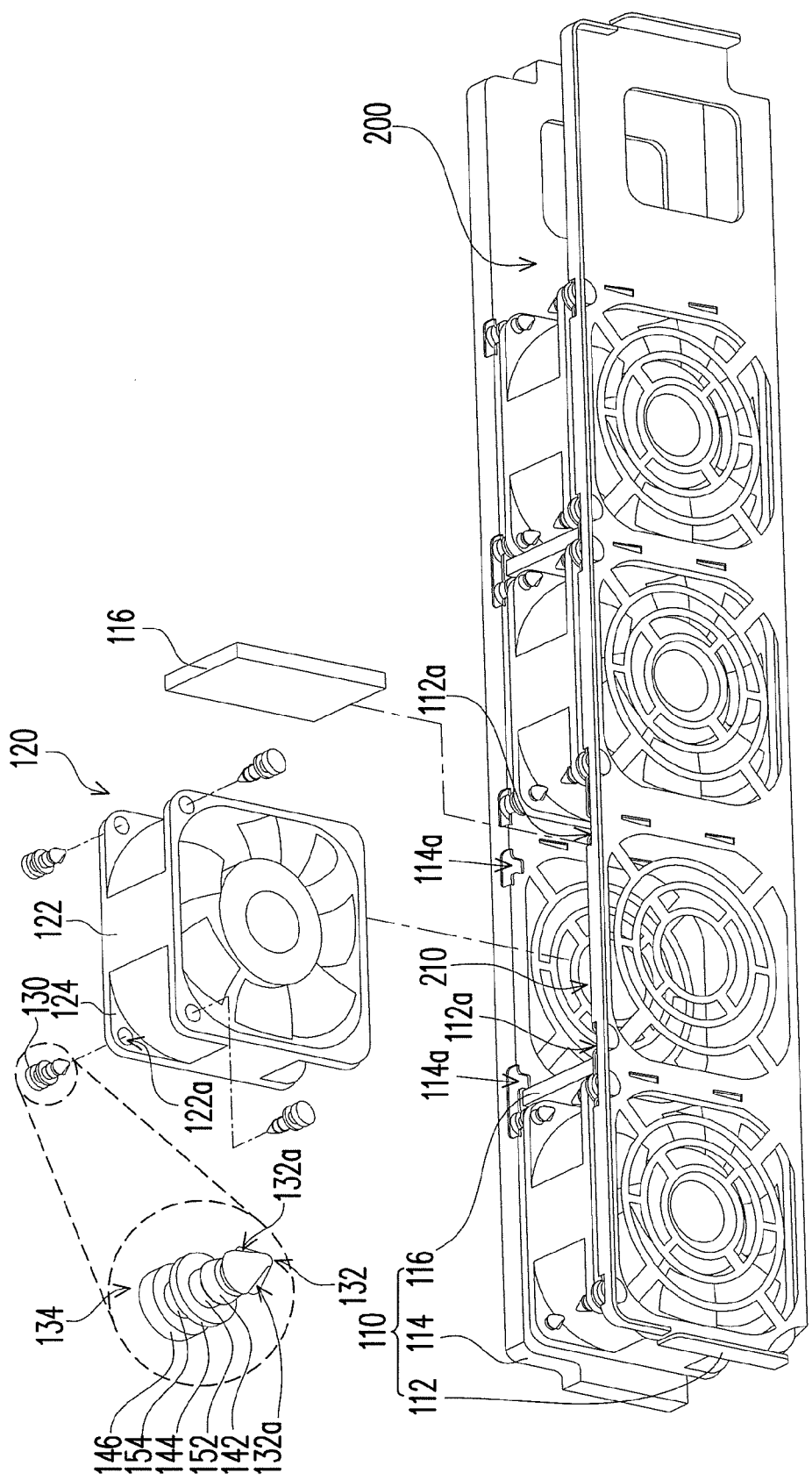
FIG. 4 is an exploded view of the fan module of FIG. 2.

In particular, FIG. 2 shows a detailed structure of the fan module 100 of FIG. 1, FIG. 3 is a partial enlarged view of the fan module 100 of FIG. 2, and FIG. 4 is an exploded view of the fan module 100 of FIG. 2. Referring to FIGS. 2 to 4, the fan module 100 includes a fan frame 110, a plurality of fan units 120, and a plurality of resilient pins 130. The fan frame 110 of this embodiment mainly consists of two sheet-shaped frame units 112 and 114, and has an accommodation space 200 between the frame units 112 and 114. In order to accommodate the fan units 120, the fan frame 110 further includes a plurality of partitions 116 disposed between the frame units 112 and 114, so as to divide the accommodation space 200 into a plurality of sub-accommodation spaces 210 for respectively accommodating each fan unit 120.

The frame units 112 and 114 are formed with mesh covers 180 at positions corresponding to air inlets and air outlets of the fan units 120 for preventing foreign matters from entering therein to influence the normal operations of the fan units 120. Moreover, the frame units 112 and 114 respectively have a plurality of mounting slots 112a and 114a thereon. In this embodiment, the mounting slots 112a and 114a are respectively located at upper edges of the frame units 112 and 114, so as to allow the resilient pins 130 to enter and be caught therein when assembling the fan module 100.

Referring to FIGS. 2 to 4, the fan units 120 are respectively disposed in the sub-accommodation spaces 210. Each of the fan units 120 has a base 122. Each base 122 has a plurality of mounting holes 122a corresponding to the mounting slots 112a and 114a. In this embodiment, the base 122 of each fan unit 120 respectively has an extension portion 124 at a position corresponding to each of the mounting slots 112a and 114a, i.e., at each corner of the fan unit 120. The mounting holes 122a respectively correspond to the mounting slots 112a or 114a and are located on the extension portions 124 and penetrate through the extension portions 124.

In this embodiment, the fan units 120 are not fixed to the fan frame 110 in a conventional securing manner using screws. Instead, the fan units 120 are mounted to the fan frame 110 by the resilient pins 130 having damping functions in this embodiment. Herein, the resilient pins 130 may be made of a known elastic material such as rubber and silica gel. Each resilient pin 130 has an insert end 132 and a catch end 134. In assembly, each of the mounting holes 122a of the fan units 120 is coupled to the resilient pin 130 first. The insert end 132 of the resilient pin 130 passes through the corresponding mounting hole 122a. Afterward, each fan unit 120 is placed into the corresponding sub-accommodation space 210 from the top of the fan frame 110, and the catch end 134 of each resilient pin 130 is caught in the corresponding mounting slot 112a or 114a, thereby completing the assembly of the fan units 120 to the fan frame 110.

In order to make the fan units 120 and the fan frame 110 be connected more stably, shapes of the resilient pins 130 are further designed in this embodiment. Referring to FIGS. 2 to 4, each of the resilient pins 130 has a first stopper portion 142, a third stopper portion 146, a second stopper portion 144 located between the first stopper portion 142 and the third stopper portion 146, a first necked-down portion 152 located between the first stopper portion 142 and the second stopper portion 144, and a second necked-down portion 154 located between the second stopper portion 144 and the third stopper portion 146. After the fan units 120 have been assembled to the fan frame 110, the first necked-down portion 152 is just located within the corresponding mounting hole 122a, and the first stopper portion 142 and the second stopper portion 144 are respectively pressed against surfaces of the extension portion 124 of the base 122 around the mounting hole 122a. Moreover, the second necked-down portion 154 is located within the corresponding mounting slot 112a or 114a, and the second stopper portion 144 and the third stopper portion 146 are respectively pressed against surfaces of the frame unit 112 or 114 around the mounting slot 1 12a or 114a.

It should be noted that, since each resilient pin 130 is elastic, the first stopper portion 142 can still successfully pass through the mounting hole 122a in assembly. In other words, the first stopper portion 142 can pass through the mounting hole 122a and thus be respectively pressed against surfaces at two sides of the extension portion 124 together with the third stopper portion 144 simply by estimating the elastic deformation of the resilient pin 130 and the mounting hole 122a and designing the architecture of the first stopper portion 142.

On the other hand, the deformation allowance of the resilient pins 130 may also be enlarged in other feasible manners in this embodiment. Referring to FIGS. 2 to 4, in this embodiment, a side edge of the insert end 132 of each resilient pin 130 is formed with a plurality of buffer slots 132a. The buffer slots 132a enable the insert end 132 of the resilient pin 130 to generate a larger shrinkage deformation upon being extruded when passing through the mounting hoe 122a, such that the deformed insert end 132 is successfully inserted into the mounting hole 122a.

To sum up, in the present invention, the fan units are connected to the fan frame by the resilient pins, so as to achieve the damping effect and reduce the operation noises. Moreover, since no screws and washers are used, the reliability problem caused by the abrasion of the washers can be avoided. In addition, the fan units can be assembled to the fan frame simply by combining the architecture of the resilient pins themselves with the mounting holes on the fan units and the mounting slots on the fan frame, which simplifies the assembling and disassembling processes, thereby improving the product production and maintenance efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan module, comprising:
   a fan frame, provided with an accommodation space therein, wherein the fan frame is disposed with a plurality of mounting slots thereon, the fan frame comprising:
   a first frame unit; and
   a second frame unit, configured in parallel with the first frame unit, wherein the accommodation space is located between the first frame unit and the second frame unit, and the mounting slots are respectively located at upper edges of the first frame unit and the second frame unit;
   at least one fan unit, disposed in the accommodation space, wherein the fan unit comprises a base, and the base comprises a plurality of mounting holes corresponding to the mounting slots; and
   a plurality of resilient pins, each comprising an insert end and a catch end, wherein the insert end is penetrated through the corresponding mounting hole and the catch end is caught in the corresponding mounting slot, such that the fan unit is mounted to the fan frame through the resilient pin.

2. The fan module according to claim 1, wherein each of the resilient pins comprises a first stopper portion, a third stopper portion, a second stopper portion located between the first stopper portion and the third stopper portion, a first necked-down portion located between the first stopper portion and the second stopper portion, and a second necked-down portion located between the second stopper portion and the third stopper portion; the first necked-down portion is located within the corresponding mounting hole, and the first stopper portion and the second stopper portion are respectively pressed against surfaces of the base around the mounting hole; and the second necked-down portion is located within the corresponding mounting slot, and the second stopper portion and the third stopper portion are respectively pressed against surfaces of the fan frame around the mounting slot.

3. The fan module according to claim 1, wherein the fan frame further comprises a plurality of partitions disposed between the first frame unit and the second frame unit, so as to divide the accommodation space into a plurality of sub-accommodation spaces for accommodating the at least one fan unit.

4. The fan module according to claim 1, wherein the base of the fan unit respectively comprises an extension portion at a position corresponding to each mounting slot, and the mounting holes are respectively located on the extension portions and penetrate through the extension portions.

5. The fan module according to claim 1, wherein a side edge of the insert end of each of the resilient pins has at least one buffer slot for providing an allowance sufficient for the insert end to enter or leave the mounting hole after elastic deformation.

* * * * *